US011923781B2

(12) United States Patent
Furuta et al.

(10) Patent No.: US 11,923,781 B2
(45) Date of Patent: Mar. 5, 2024

(54) POWER CONVERSION DEVICE

(71) Applicant: Hitachi Automotive Systems, Ltd., Hitachinaka (JP)

(72) Inventors: Yoichiro Furuta, Hitachinaka (JP); Kenichirou Nakajima, Hitachinaka (JP); Yuta Numakura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 587 days.

(21) Appl. No.: 16/973,309

(22) PCT Filed: May 8, 2019

(86) PCT No.: PCT/JP2019/018332
§ 371 (c)(1),
(2) Date: Dec. 8, 2020

(87) PCT Pub. No.: WO2019/244491
PCT Pub. Date: Dec. 26, 2019

(65) Prior Publication Data
US 2021/0249967 A1 Aug. 12, 2021

(30) Foreign Application Priority Data

Jun. 22, 2018 (JP) ................. 2018-118741

(51) Int. Cl.
H05K 5/00 (2006.01)
H02M 1/44 (2007.01)
H02M 7/00 (2006.01)

(52) U.S. Cl.
CPC ............ H02M 7/003 (2013.01); H02M 1/44 (2013.01)

(58) Field of Classification Search
CPC ..... H05K 5/0017; H05K 5/0217; H02M 1/44; H02M 7/003
(Continued)

(56) References Cited

U.S. PATENT DOCUMENTS 7,061,775 B2 * 6/2006 Beihoff ................ H02M 7/003
361/752
2013/0265808 A1 * 10/2013 Ishii ....................... H02M 1/12
363/97

(Continued)

FOREIGN PATENT DOCUMENTS

JP 2014-072938 A 4/2014
JP 2014-168360 A 9/2014

(Continued)

OTHER PUBLICATIONS

International Search Report with English translation and Written Opinion issued in corresponding application No. PCT/JP2019/018332 dated Jul. 30, 2019.

Primary Examiner — Hung S. Bui
(74) Attorney, Agent, or Firm — Foley & Lardner LLP

(57) ABSTRACT

Provided is a power conversion device capable of suppressing an increase in cost and an increase in size of the device. A control board 113 that includes a connection unit 140 to which a signal connector 114 which transmits a signal is connected, a base member 120 that supports the control board 113 and has conductivity, and a case 110 that accommodates the control board 113 and the base member 120 and is connected to a ground is provided. The base member 120 includes a supporting portion 141 that is connected to one surface of the control board 113, and a first extending portion 130 of which one end is connected to the supporting portion 141 and the other end extends to the case 110 to be connected to the case 110. An electronic component 113a that generates noise is mounted on the control board 113, and the first extending portion 130 and the supporting portion 141 form an electrical path. The first extending portion 130 is arranged at a position at which a distance between the first extending portion and the electronic com- (Continued)

ponent 113a is shorter than a distance between the connection unit 140 and the electronic component 113a.

6 Claims, 8 Drawing Sheets

(58) Field of Classification Search
USPC ........ 361/731, 807, 728, 730, 809, 800, 810
See application file for complete search history.

(56) References Cited

U.S. PATENT DOCUMENTS

| | | | |
|---|---|---|---|
| 2014/0126154 A1* | 5/2014 | Higuchi | ................. B60L 50/51 361/714 |
| 2015/0163961 A1 | 6/2015 | Hara | |
| 2019/0081555 A1 | 3/2019 | Li | |

FOREIGN PATENT DOCUMENTS

| | | | | |
|---|---|---|---|---|
| JP | 2014-207832 | * | 10/2014 | ............... H05K 7/20 |
| WO | WO-2017/145449 A1 | | 8/2017 | |

* cited by examiner

POWER CONVERSION DEVICE

TECHNICAL FIELD

The present invention relates to a power conversion device.

BACKGROUND ART

Power conversion devices such as inverters and DC/DC converters are mounted on hybrid vehicles and electric vehicles. In these power conversion devices, a semiconductor element is switched, and thus, a DC voltage is converted into an AC voltage or another DC voltage. For example, in the DC/DC converter, a high DC voltage of several hundreds of volts supplied from a battery is converted into a low DC voltage of tens of volts to be supplied to vehicle accessories.

The power conversion device generally includes electric circuit devices such as a strong electric system circuit and a weak electric system circuit. For example, the strong electric system circuit of the DC/DC converter includes a switching circuit that converts a DC voltage into an AC voltage or an AC voltage into a DC voltage, a transformer that performs an AC voltage conversion, and the like. The weak electric system circuit includes a control circuit that generates a control signal for controlling an operation of the switching circuit, a filter circuit, and the like. In the power conversion device mounted on a vehicle, it is preferable that these circuits be accommodated in the same metal housing in order to achieve downsizing and integration. However, when the strong electric system circuit and the weak electric system circuit are accommodated in the same metal housing, electromagnetic noise generated from the strong electric system circuit is electromagnetically coupled to the weak electric system circuit, and thus, conduction noise to the outside may be generated. In such a case, there is a problem that a noise regulation value determined according to a legal regulation or requirements on a vehicle side cannot be satisfied with a level of the conduction noise.

In order to solve this problem, a technology in which a metal base plate is arranged between the strong electric system circuit (noise generation circuit unit) serving as a noise generation source and the weak electric system circuit (control board), the base plate is divided into a first base plate and a second base plate, and a slit acting as a high impedance mechanism is provided between these base plates has been proposed. As described above, in the power conversion device, measures are taken to reduce transmission noise to the outside. An example of such a technology is PTL 1.

CITATION LIST

Patent Literature

PTL 1: WO2017/145449

SUMMARY OF INVENTION

Technical Problem

However, in the technology described in PTL 1, since the metal base plate is newly provided for the noise reduction, there is a possibility that cost is increased.

Since the base plate is arranged between the strong electric system circuit (noise generation circuit unit) and the weak electric system circuit (control board) and is divided such that the slit is formed, a dimension in a height direction is increased, and thus, there is a possibility that a size of the device is increased.

The present invention has been made in order to solve the problems, and an object of the present invention to provide a power conversion device capable of suppressing an increase in cost and an increase in size of the device.

Solution to Problem

In order to achieve the object, the present invention provides a power conversion device including a control board that includes a connection unit to which a signal connector which transmits a signal is connected, a base member that supports the control board, and has conductivity, and a case that accommodates the control board and the base member, and is connected to a ground. The base member includes a supporting portion that is connected to one surface of the control board, and a first extending portion of which one end is connected to the supporting portion and the other end extends to the case to be connected to the case, an electronic component that generates noise is mounted on the control board, the first extending portion and the supporting portion form an electrical path, and the first extending portion is arranged at a position at which a distance between the first extending portion and the electronic component is shorter than a distance between the connection unit and the electronic component.

Advantageous Effects of Invention

According to the present invention, it is possible to provide a power conversion device capable of suppressing an increase in cost and an increase in size of the device.

DESCRIPTION OF EMBODIMENT

An embodiment of a power conversion device according to the present invention will be described below with reference to the drawings. The present invention is not limited to the following embodiments, and various modifications and applications can be made within a technical concept of the present invention.

Figure 1:
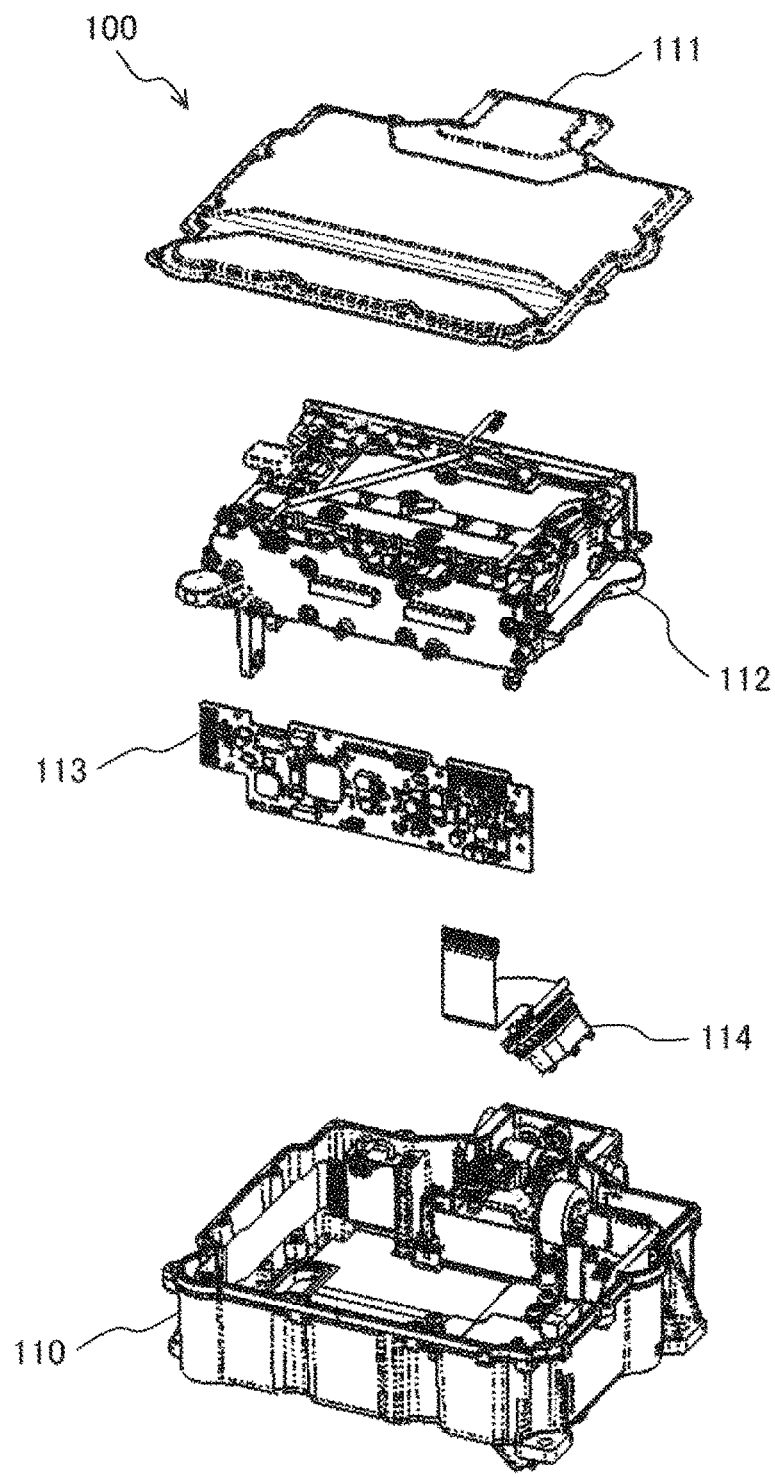
FIG. 1 is an exploded perspective view of a power conversion device according to an embodiment of the present invention.

FIG. 1 is an exploded perspective view of the power conversion device according to the embodiment of the present invention. In FIG. 1, a power conversion device 100 has an outer shell formed by a case 110 having an opened upper portion and a cover 111 closing an opening of the case 110. A sub-module 112, a control board 113, and a signal connector 114 are housed in the case 110 and covered with a cover 111. The case 110 is connected to a ground (not illustrated).

The sub-module 112 includes a device that converts a DC current from a battery into an AC current, and has a flow path through which a refrigerant flows. A signal connector 114 transmits a signal, is connected to a connection unit (not illustrated) of a side of vehicle such as an automobile and a control board 113, and transmits and receives a signal between the vehicle side and the control board 113.

Figure 2:
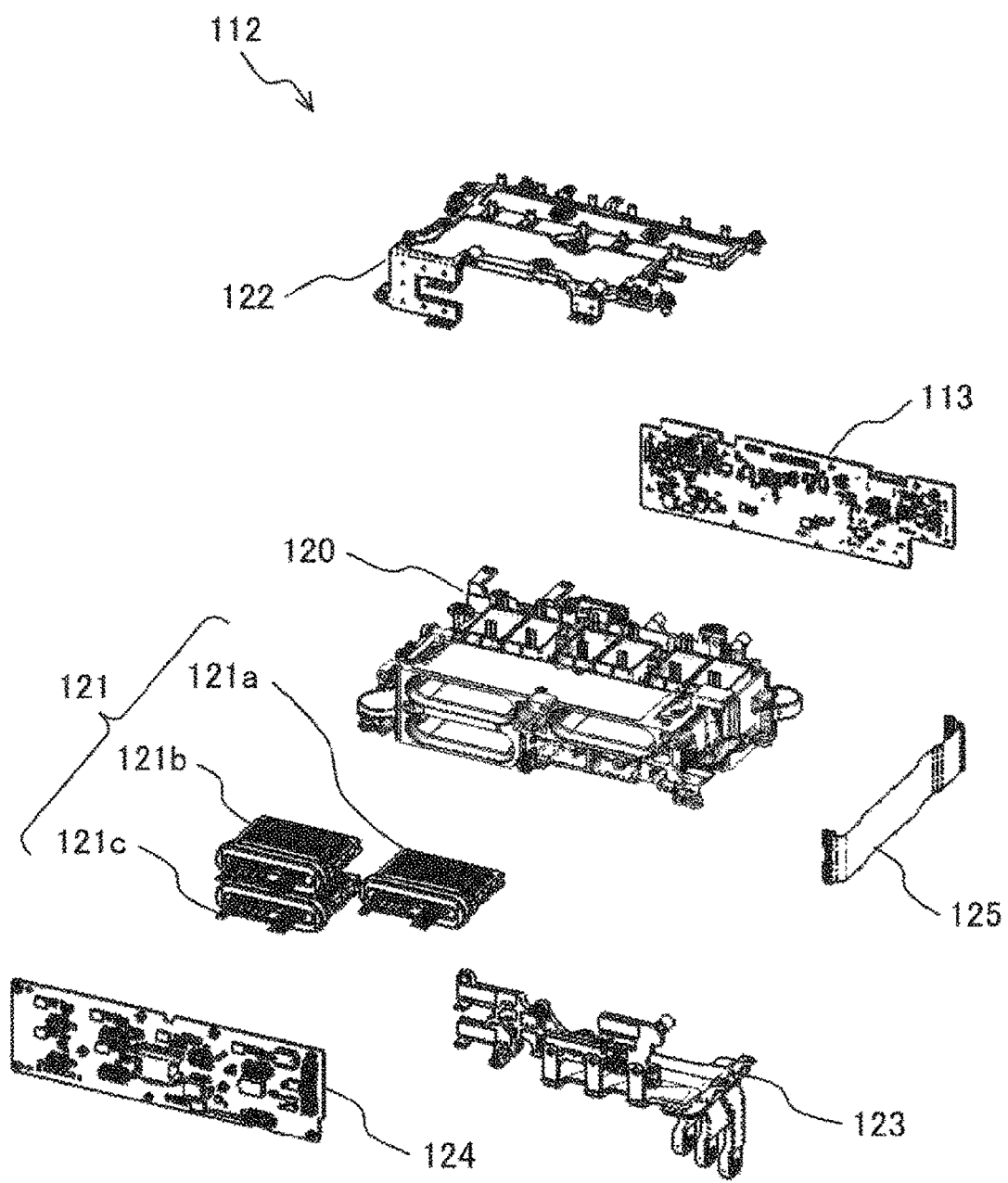
FIG. 2 is an exploded perspective view of a sub-module according to the embodiment of the present invention.

Next, a configuration of the sub-module 112 will be described. FIG. 2 is an exploded perspective view of the sub-module according to the embodiment of the present invention.

In FIG. 2, a base member 120 has conductivity, accommodates a plurality of power modules 121 (121a, 121b, and 121c), and has a flow path through which a refrigerant flows. The power modules 121 are provided with a U phase, a V phase, and a W phase, and there are a total of three power modules 121a, 121b, and 121c. Each of the power modules 121 includes a switching element that converts a DC current into an AC current, converts a DC current input from a DC bus bar 122 into an AC current, and outputs the AC current to an AC bus bar 123. The power module 121 is connected to a drive circuit board 124. The drive circuit board 124 outputs a signal for driving the switching element of the power module 121. A flat cable 125 connects the control board 113 and the drive circuit board 124. The control board 113 outputs a control signal for controlling the power module. The control board 113 and the drive circuit board 124 are arranged so as to face each other with the base member 120 interposed therebetween. The refrigerant flows through the flow path of the base member 120, and cools the power module 121. The control board 113 and the drive circuit board 124 are arranged such that flat surfaces of the boards are along a vertical direction (up-down direction) and one-side surfaces thereof face the base member 120. In the present embodiment, the control board 113, the base member 120, and the case 110 constitute an electric circuit device.

Figure 3:
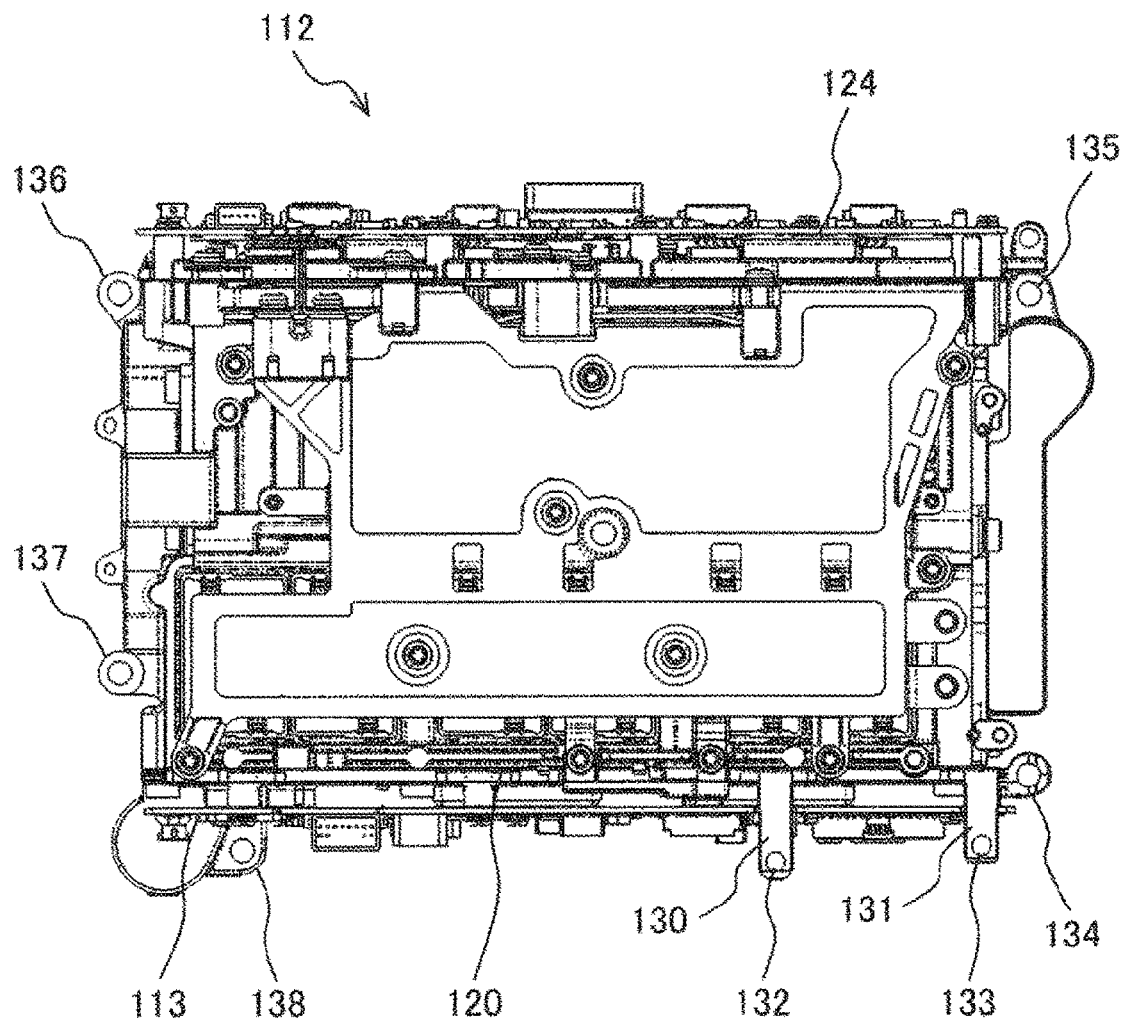
FIG. 3 is a top view of the sub-module according to the embodiment of the present invention.

Next, an assembled state of the sub-module 112 will be described with reference to FIG. 3. FIG. 3 is a top view of the sub-module according to the embodiment of the present invention. An extending portion that extends outside toward the case 110 is provided at the base member 120. In the present embodiment, the extending portion includes a first extending portion 130 and a second extending portion 131 (a plurality of extending portions). The first extending portion 130 and the second extending portion 131 are formed integrally with the base member 120, and have conductivity. A first fixing portion 132 for fixing the base member to the case 110 is provided at the first extending portion 130, and a second fixing portion 133 for fixing the base member to the case 110 is similarly provided at the second extending portion 131. Functions of the first extending portion 130 and the second extending portion 131 will be described later.

A third fixing portion 134, a fourth fixing portion 135, a fifth fixing portion 136, a sixth fixing portion 137, and a seventh fixing portion 138 for fixing the base member to the case 110 are provided at the base member 120, and the base member 120 is fixed to the case 110 by inserting screws into the fixing portions and fastening the fixing portions.

When the power conversion device 100 is driven, noise is generated from electronic components mounted on the control board 113. The generated noise is propagated on the control board 113, and is propagated to the third fixing portion 134 to the seventh fixing portion 138 via the base member 120. The noise propagated to the third fixing portion 134 to the seventh fixing portion 138 is further propagated to the case 110. The third fixing portion 134 to the seventh fixing portion 13 are arranged at four corners of the case 110. Among the third fixing portion 134 to the seventh fixing portion 138, the third fixing portion 134 arranged at a distance close to the control board 113 has the highest noise removal effect.

However, since the signal connector 114 that transmits and receives the signal to and from the vehicle side is connected to the control board 113, the noise from the electronic components mounted on the control board 113 is propagated to the vehicle side via the signal connector 114, and thus, there is a possibility that malfunction of the control board on the vehicle side occurs. Although some noise can be removed by the third fixing portion 134 to the seventh fixing portion 138, when the signal connector 114 is arranged between a noise generating portion serving as a noise transmission path and the third fixing portion 134 to the seventh fixing portion 138, the noise is propagated to the signal connector 114 before reaching the third fixing portion 134 to the seventh fixing portion. Thus, a sufficient effect for removing the noise propagated from the signal connector 114 to the vehicle side cannot be exhibited by only the third fixing portion 134 to the seventh fixing portion 138. Means for solving this problem will be described with reference to FIGS. 4 to 8.

Figure 4:
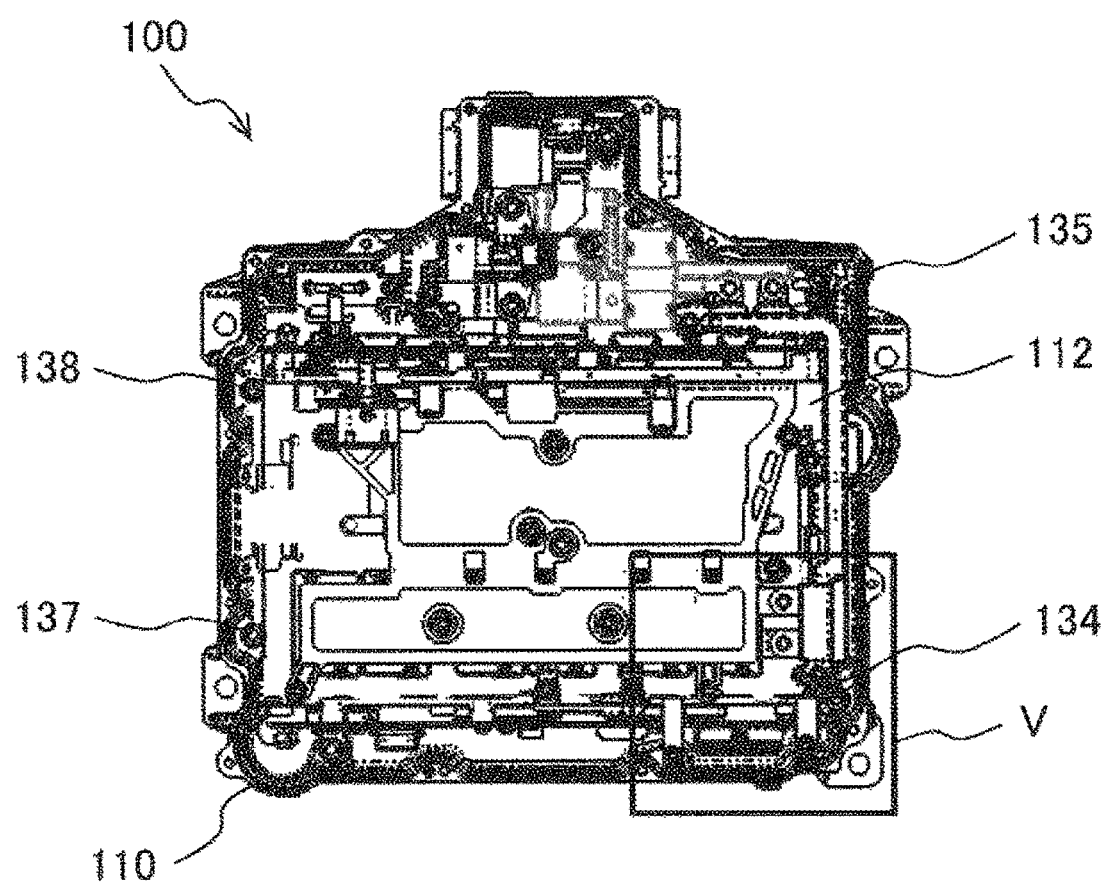
FIG. 4 is a top view of the power conversion device according to the embodiment of the present invention.
Figure 5:
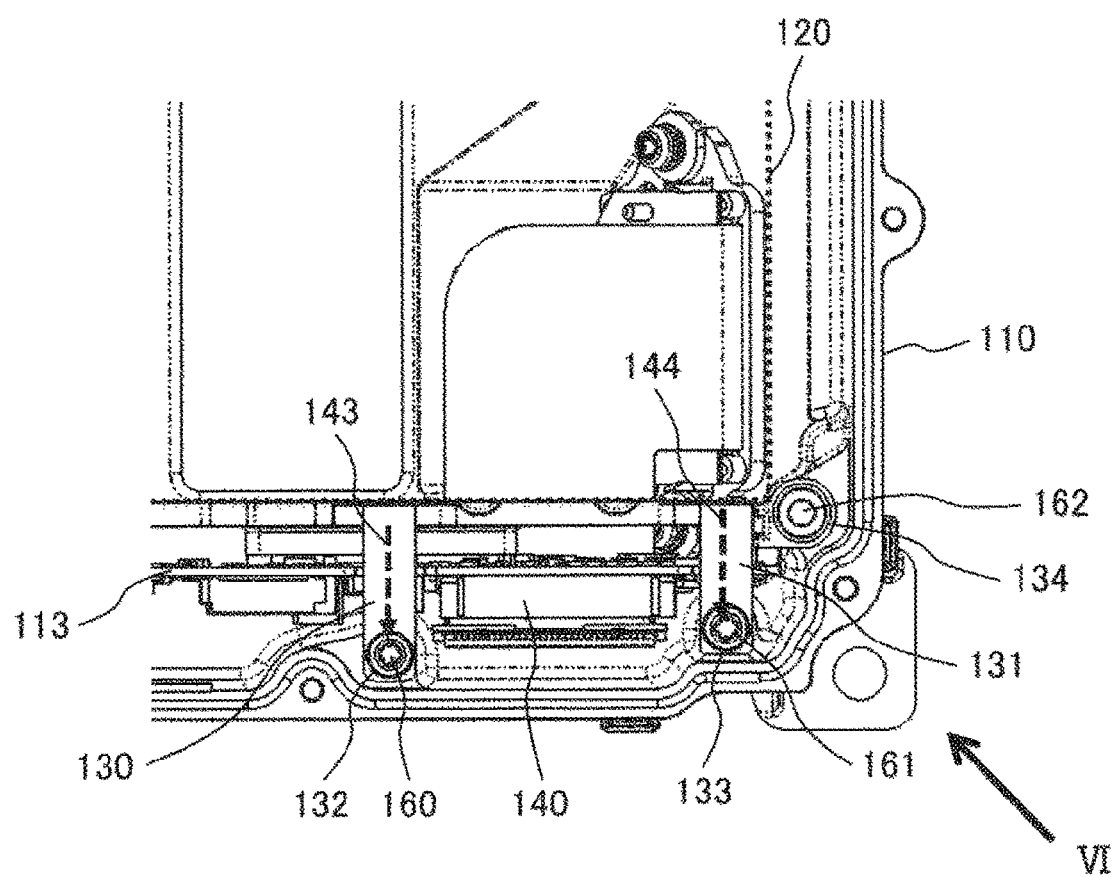
FIG. 5 is an enlarged view of a V portion in FIG. 4.
Figure 6:
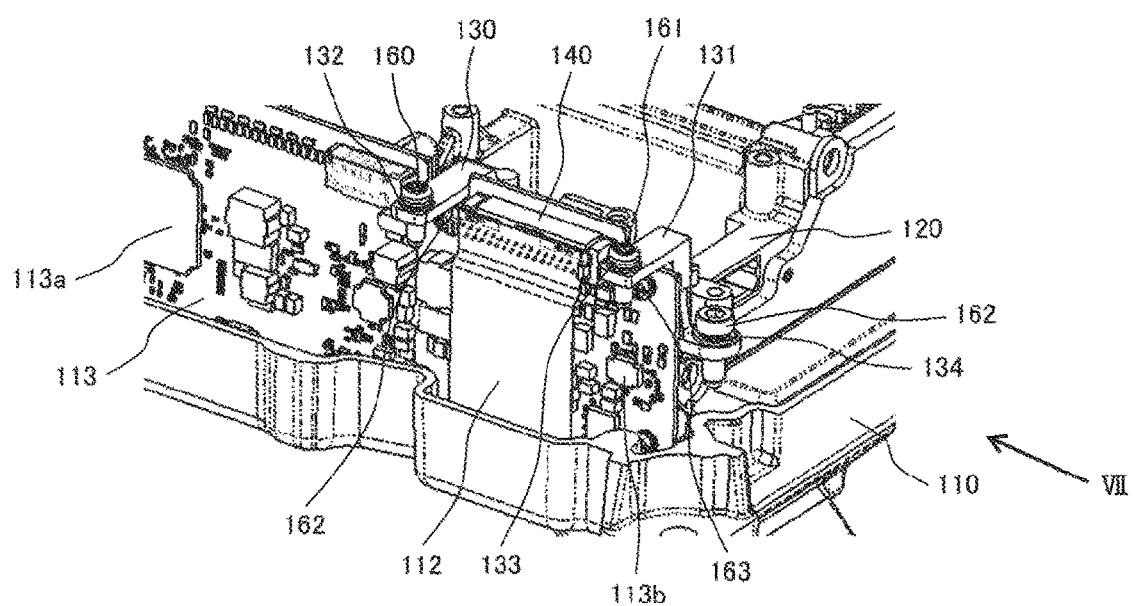
FIG. 6 is a perspective view seen from a VI direction in FIG. 5.
Figure 7:
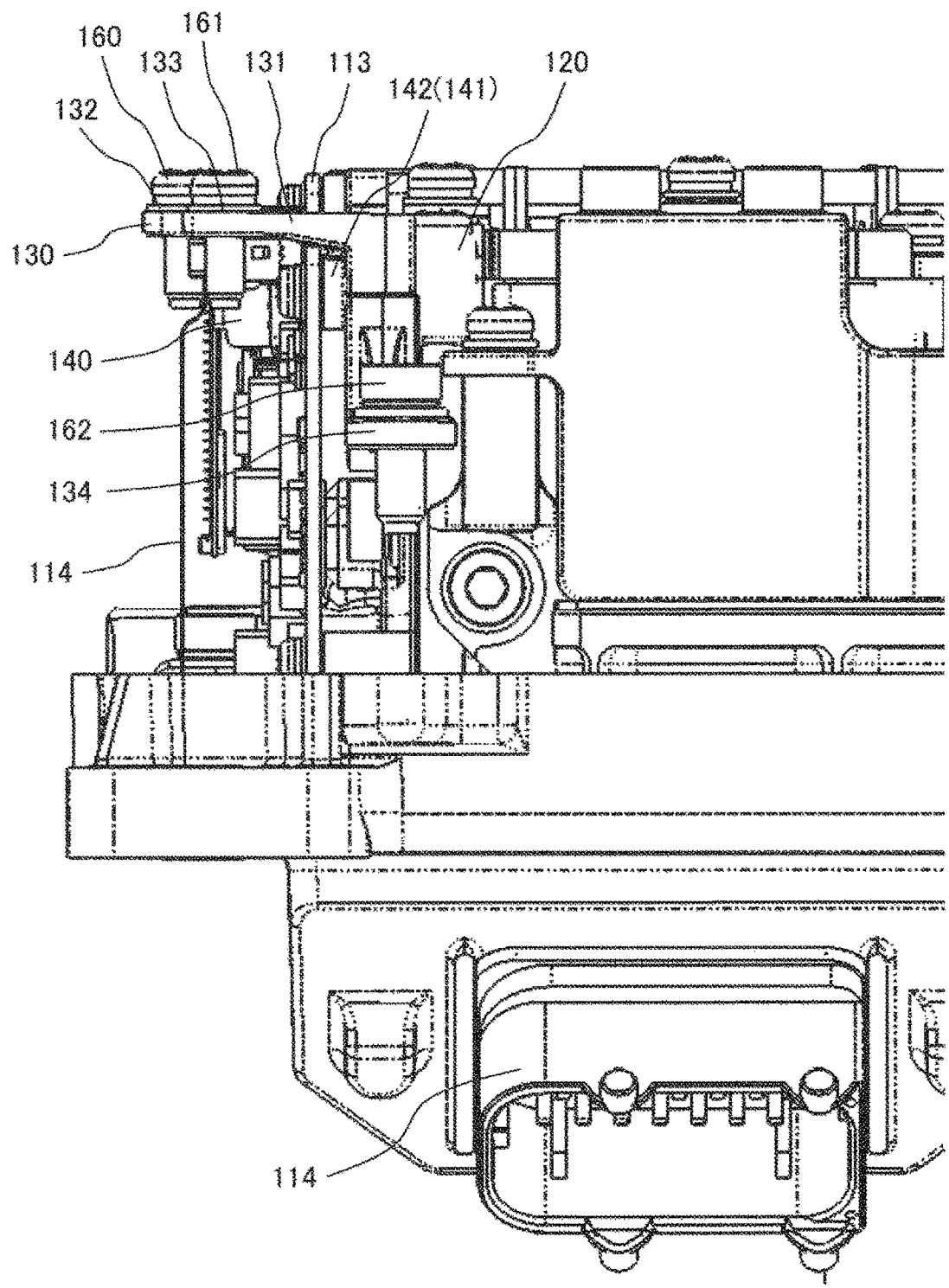
FIG. 7 is a perspective view seen from a VII direction in FIG. 6.
Figure 8:
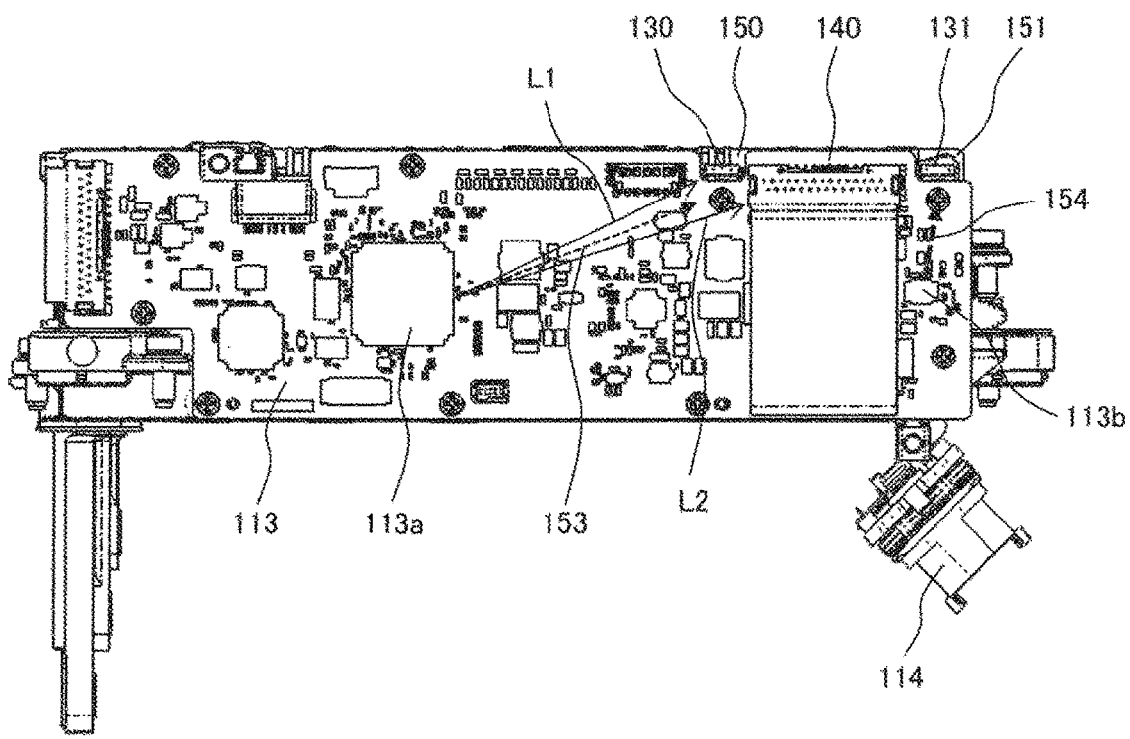
FIG. 8 is a front view of a control board according to the embodiment of the present invention.

FIG. 4 is a top view of the power conversion device according to the embodiment of the present invention, FIG. 5 is an enlarged view of a V portion in FIG. 4, FIG. 6 is a perspective view seen from a VI direction in FIG. 5, and FIG. 7 is a perspective view seen from a VII direction in FIG. 6, and FIG. 8 is a front view of the control board according to the embodiment of the present invention.

FIG. 4 illustrates a state in which the cover 111 of the power conversion device 100 is removed, and the case 110 accommodates the sub-module 112. As illustrated in FIG. 4, the base member 120 constituting the sub-module 112 is fixed to the case 110 with a screw 162 or the like via the above-described third fixing portion 134 to seventh fixing portion 138. The screw 162 in the diagram is a screw arranged in the third fixing portion 134.

As illustrated in FIGS. 5 to 8, the first extending portion 130 and the second extending portion 131 that extend outside toward the case 110 are provided at the base member 120. The first fixing portion 132 for fixing the base member to the case 110 is provided at a front end of the first extending portion 130, and the second fixing portion 133 for fixing the base member to the case 110 is similarly provided at a front end of the second extending portion 131. Screws 160 and 161 are inserted into the first fixing portion 132 and the second fixing portion 133, and thus, the first fixing portion 132 and the second extending portion 131 are fixed to the case 110. As described above, one end of each of the first extending portion 130 and the second extending portion 131 is connected to the base member 120, and the other end is connected to the case 110. A connection unit 140 to which one end of the signal connector 114 is connected is provided in the control board 113. As illustrated in FIG. 8, the connection unit 140 of the present embodiment is arranged near a corner side of the control board 113.

As illustrated in FIGS. 5 to 7, the first extending portion 130 and the second extending portion 131 extend across the control board 113 arranged such that the flat surfaces of the boards extend in the vertical direction (up-down direction). The "across" in the present embodiment means that the extending portions extend from one surface of the control board 113 to the other surface, and the extending portions do not need to sandwich the control board 113. The connection unit 140 is arranged in a space sandwiched by the first extending portion 130 and the second extending portion 131.

As illustrated in FIG. 7, a supporting portion 142 that supports the control board 113 is formed at a position of the base member 120 at which the second extending portion 131 is formed. Although not illustrated in FIG. 7, a supporting portion 141 that supports the control board 113 is also formed at a position of the base member 120 at which the first extending portion 130 is formed. The supporting portions 141 and 142 are formed integrally with the base member 120, and have conductivity. The supporting portion 141 and the first extending portion 130, and the supporting portion 142 and the second extending portion 131 both have conductivity, and are electrically connected. The first extending portion 130 and the second extending portion 131 are connected and fixed to the case 110 connected to the ground, and thus, an electrical path is formed.

Screws 162 and 163 are arranged at positions of the control board 113 facing the supporting portions 141 and 142, respectively, and fix the control board 113 to the supporting portions 141 and 142. Accordingly, the control board 113 is connected to the first extending portion 130 and the second extending portion 131 of the base member 120 via the supporting portions 141 and 142.

Notches 150 and 151 are formed in the upper portion of the control board 113, and the first extending portion 130 and the second extending portion 131 are arranged in the notches 150 and 151. In the present embodiment, since the notches 150 and 151 in which the first extending portion 130 and the second extending portion 131 are positioned are provided at the control board 113, the base member 120 and the control board 113 can be aligned along the first extending portion 130 and the second extending portion 131 when the control board is attached to the base member, and attachment workability of the control board 113 can be improved. Although the notches 150 and 151 are used in the present embodiment, through-holes may be formed instead of the notches 150 and 151, and the first extending portion 130 and the second extending portion 131 may be inserted into the through-holes.

Electronic components 113a and 113b which are noise generation sources are mounted on the control board 113. When the power conversion device 100 is driven, the noise is generated from the electronic components 113a and 113b mounted on the control board 113. Although there is a possibility that the generated noise is propagated from the connection unit 140 to the signal connector 114 and is propagated to a vehicle-side control circuit, the propagation of the noise to the connection unit 140 is suppressed by the first extending portion 130 and the second extending portion 131 arranged so as to sandwich the connection unit 140 in the present embodiment.

For example, some noise generated in the electronic component 113a is propagated through the control board 113 as illustrated in FIG. 8, and is propagated to the third fixing portion 134 side along a noise propagation path 153. Although the connection unit 140 is arranged on the way to the third fixing portion 134 side, since the first extending portion 130 is arranged between the electronic component 113a and the connection unit 140, the noise propagated through the control board 113 is propagated to the first extending portion 130 connected to the control board 113 via the supporting portion 141. The first extending portion 130 is arranged between the electronic component 113a and the connection unit 140, and thus, a distance from the electronic component 113a to the first extending portion 130 is shorter than a distance from the electronic component 113a serving as the noise generation source to the third fixing portion 134. As a result, an impedance is lowered, and thus, the noise is easily propagated to the first extending portion 130. A noise propagation path 143 is formed in the first extending portion 130, and the noise propagated through the noise propagation path 143 is propagated from the first fixing portion 132 of the first extending portion 130 to the case 110 (FIG. 5). In the present embodiment, the first extending portion 130 is arranged such that a distance L1 connecting the electronic component 113a and the first extending portion 130 is shorter than a distance L2 connecting the electronic component 113a and the connection unit 140 (L1<L2). The noise generated from the electronic component 113a is propagated to the connection unit 140 side along the noise propagation path 153, but the noise generated from the electronic component 113a is propagated to the first extending portion 130 having the distance shorter than the connection unit 140.

In the present embodiment, since the first extending portion 130 is provided between the electronic component 113a and the connection unit 140 in the vicinity of the connection unit 140, the propagation of the noise generated from the electronic component 113a to the connection unit 140 can be suppressed.

For example, the electronic component 113b serving as the noise generation source may be mounted on the control board 113 at a position closer to the connection unit 140 than the first extending portion 130. There is a possibility that the noise generated in the electronic component 113b is propagated to the connection unit 140 before being propagated to the first extending portion 130. Thus, the second extending portion 131 is provided in the present embodiment. Some noise generated in the electronic component 113b is propagated through the control board 113, and is propagated to the connection unit 140 side along a noise propagation path 154. The noise propagated through the control board 113 is propagated to the supporting portion 142 to the second extending portion 131 connected to the control board 113 via the supporting portion 142 between the electronic component 113a and the connection unit 140. A noise propagation path 144 is formed in the second extending portion 131, and the noise propagated through the noise propagation path 144 is propagated from the second fixing portion 134 of the second extending portion 131 to the case 110. In the present embodiment, since the second extending portion 131 is provided between the electronic component 113b and the connection unit 140 in the vicinity of the connection unit 140, the propagation of the noise generated from the electronic component 113b to the connection unit 140 can be suppressed.

As described above, according to the present embodiment, since the first extending portion 130 of which one end is connected to the control board 113 via the supporting portion 141 and the other end is connected to the case 110 is provided and the first extending portion 130 is arranged at the position at which the distance between the first extending portion 130 and the electronic component 113a is shorter than the distance between the connection unit 140 and the electronic component 113a, the transmission of the noise generated from the electronic component 113a (electronic component 113b) to the vehicle side via the connection unit 140 can be suppressed.

According to the present embodiment, since each of the first extending portion 130 and the second extending portion 131 (a plurality of extending portions) of which the one end is connected to the control board 113 and the other end is connected to the case 110 is provided and the connection unit 140 provided at the control board 113 is provided between the first extending portion 130 and the second extending portion 131, the transmission of the noise generated from the electronic components 113a and 113b to the vehicle side via the connection unit 140 can be suppressed.

The present invention is not limited to the aforementioned embodiment, and includes various modification examples. For example, the aforementioned embodiment is described in detail in order to facilitate easy understanding of the present invention, and is not limited to necessarily include all the described components.

REFERENCE SIGNS LIST

100 power conversion device
110 case
112 sub-module
113 control board
113a electronic component
113b electronic component
114 signal connector
120 base member
121 power module
124 drive circuit board
130 first extending portion
131 second extending portion
132 fixing portion
133 fixing portion
141 supporting portion
142 supporting portion
143 noise propagation path
144 noise propagation path
150 notch
151 notch
153 noise propagation path

The invention claimed is:

1. A power conversion device, comprising:
a control board that includes a connection unit to which a signal connector which transmits a signal is connected;
a base member that supports the control board, and has conductivity;
a case that accommodates the control board and the base member, and is connected to a ground, wherein the base member includes:
a supporting portion that is connected to one surface of the control board;
a first extending portion of which one end is connected to the supporting portion and another end extends to the case to be connected to the case; and
a second extending portion of which one end is connected to the supporting portion and another end extends to the case to be connected to the case, wherein the first extending portion and the second extending portion sandwich the connection unit between the first extending portion and the second extending portion; and
an electronic component that generates noise mounted on the control board, wherein the first extending portion and the supporting portion form an electrical path, and the first extending portion is arranged at a position at which a distance between the first extending portion and the electronic component is shorter than a distance between the connection unit and the electronic component.

2. The power conversion device according to claim 1, wherein the control board is arranged such that flat surfaces of the board are along an up-down direction, and the first extending portion extends from one surface to the other surface across the control board.

3. The power conversion device according to claim 2, wherein the control board includes a notch, and the first extending portion is arranged in the notch.

4. The power conversion device according to claim 1, wherein the first extending portion is arranged between the electronic component and the connection unit.

5. The power conversion device according to claim 1, further comprising a second extending portion of which one end is connected to the supporting portion and another end extends to the case to be connected to the case.

6. The power conversion device according to claim 1, wherein the control board is coupled to the first extending portion and the second extending portion by the supporting portion.

* * * * *